(12) United States Patent
Sloat et al.

(10) Patent No.: US 11,109,718 B1
(45) Date of Patent: Sep. 7, 2021

(54) SYSTEM FOR A COOKWARE LID HOLDER

(71) Applicants: Anthony Sloat, Huntington Beach, CA (US); Aaron Welch, Huntington Beach, CA (US)

(72) Inventors: Anthony Sloat, Huntington Beach, CA (US); Aaron Welch, Huntington Beach, CA (US)

( * ) Notice: Subject to any disclaimer, the term of this patent is extended or adjusted under 35 U.S.C. 154(b) by 0 days.

(21) Appl. No.: 16/807,222

(22) Filed: Mar. 3, 2020

(51) Int. Cl.
| F16M 11/04 | (2006.01) |
| A47J 47/16 | (2006.01) |
| A47J 36/06 | (2006.01) |

(52) U.S. Cl.
CPC ............ *A47J 47/16* (2013.01); *F16M 11/041* (2013.01); *F16M 11/045* (2013.01); *F16M 11/046* (2013.01); *F16M 11/048* (2013.01); *A47J 36/06* (2013.01)

(58) Field of Classification Search
CPC combination set(s) only.
See application file for complete search history.

(56) References Cited

U.S. PATENT DOCUMENTS

| 630,317 | A | * | 8/1899 | Berg | A47J 27/62 |
| | | | | | 126/374.1 |
| 2,605,069 | A | * | 7/1952 | Gillaspy | A61J 9/0661 |
| | | | | | 248/103 |
| 4,712,313 | A | * | 12/1987 | Gettleman | A45D 20/16 |
| | | | | | 248/205.2 |
| 4,735,388 | A | * | 4/1988 | Marks | A61J 9/0638 |
| | | | | | 248/103 |
| 5,038,945 | A | * | 8/1991 | Melkonian | A47F 5/0087 |
| | | | | | 211/96 |
| 5,100,091 | A | * | 3/1992 | Pollak | A61G 5/10 |
| | | | | | 248/278.1 |
| 5,246,195 | A | | 9/1993 | Huff | |
| 6,361,004 | B1 | * | 3/2002 | Witherspoon | A47J 36/12 |
| | | | | | 248/213.2 |
| 6,763,965 | B2 | * | 7/2004 | Parenteau | A47J 45/10 |
| | | | | | 220/263 |
| 6,896,230 | B2 | * | 5/2005 | Cvek | F16M 11/10 |
| | | | | | 248/276.1 |
| 7,284,733 | B2 | * | 10/2007 | Parenteau | A47J 45/10 |
| | | | | | 220/263 |
| 8,083,196 | B2 | * | 12/2011 | Chang | A61B 90/50 |
| | | | | | 248/276.1 |

(Continued)

*Primary Examiner* — Monica E Millner
(74) *Attorney, Agent, or Firm* — Sanchelima & Associates PA; Christian Sanchelima; Jesus Sanchelima (57) ABSTRACT

A system for a cookware lid holder including a mounting assembly, an arm adjusting assembly and a lid clamping assembly is disclosed. The mounting assembly allows securing of the system to any surface, primarily with the use of a clamp. Once the system is secured it is possible to adjust the positions and angles of the arm adjusting assembly as is most comfortable and suitable for a user. The arm adjusting assembly allows for customization in order to position lids of cooking pots to be held out of the way when storing or when cooking even. The lid clamping assembly permits for lids of predetermined dimensions to be secured and moved about with the arm adjusting assembly. The arm adjusting assembly includes a first and second holding arm that expand outwardly if need be. The lids can be moved freely while being held due to an arm pivot.

11 Claims, 5 Drawing Sheets

(56) References Cited

U.S. PATENT DOCUMENTS

| | | | | |
|---|---|---|---|---|
| 8,727,139 B1* | 5/2014 | Sventek | ................... | A47J 47/16 |
| | | | | 211/41.6 |
| 9,709,217 B2* | 7/2017 | Trinh | ................. | F16M 11/2021 |
| 10,413,118 B2* | 9/2019 | Camden | ................... | A47J 36/12 |
| 2003/0183633 A1* | 10/2003 | Pope | ....................... | B65F 1/163 |
| | | | | 220/263 |

* cited by examiner

SYSTEM FOR A COOKWARE LID HOLDER

BACKGROUND OF THE INVENTION

1. Field of the Invention

The present invention relates to a lid holder and, more particularly, to a lid holder that allows for suspending of cookware lids in midair while cooking as to allow access to the pots and pans momentarily without needing to find space to place down the cookware lids.

2. Description of the Related Art

Several designs for lid holders have been designed in the past. None of them, however, include a wall mounted cooking pot lid holder comprising an extended bendable, flexible arm with multiple articulating joints and a lid handle clamping device on the distal end wherein the cooking pot lid is secured to the holding arm and can be positioned on the cooking pot and moved up out of the way when not in use. People often find themselves in the kitchen cooking great and delicious meals. Substantial amounts of time are spent in the kitchen as food is obviously essential. When cooking there is often a need to remove the lid from the cookware in order to add spices to food or in order to let steam out from the cookware for venting. To do so the lid is entirely lifted from the cookware and must be placed down elsewhere, however, in some kitchens there is a lack of space and it becomes troublesome to find space for the lids. Other times, the lid needs to be removed only momentarily. As such, there is a need for the present invention. The present invention being a mountable cooking pot lid holder that is flexible and capable of suspending the cooking lids in midair momentarily or until needed again. Additionally, the present invention is capable of positioning and moving the cooking pot lid in a variety of ways and positions to prevent dripping of liquids from the cooking lid to prevent stove tops from getting dirty.

Applicant believes that a related reference corresponds to U.S. Pat. No. 5,246,195 issued to Daniel C. Huff for Lid Holder. It is lid holder provided for attachment to a wall to securely hold a pot or pan lid when not in use. The lid holder comprises a base which is adapted to lie adjacent to the wall when the lid holder is attached to the wall. Included are two support members connected to the base that extend outward from the base. A retaining member is connected to the base that extends outwardly from the base. The support members engage and support the to surface of the lid and the retaining member engages the interior lip of the lid to properly secure the lid. There is also a shield provided to prevent any wall damage. However, it differs from the present invention because the Huff reference is intended only for use when the lids of the cookware are being stored. The present invention suspends the cooking lids in a variety of ways in midair. It may be possible for the lids to be suspended either facing upwardly or downwardly. Further, it may be possible for the present invention to be retrofitted onto a surface in a variety of way. Further, the present invention can be used while a user is in the midst of cooking.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a cookware lid holder that is capable of suspending cooking pot lids in midair during use or during storage.

It is another object of this invention to provide a cookware lid holder that can hold and secure cooking pot lids at a variety of angles.

It is still another object of the present invention to provide a cookware lid holder that can be retrofitted onto existing surfaces.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Referring now to the drawings, where the present invention is generally referred to with numeral 10, it can be observed that it, a cookware lid holder 10, basically includes a mounting assembly 20, an adjusting arm assembly 60, a lid handle clamping assembly 120.

There are is a need to move lids around when cooking in order to add spices and flavoring to the food. In some kitchens space is limited and it becomes a hassle to move lids around as there is barely countertop space to place the lids thereon. There is a need for means that allow for holding and storing lids, while cooking or otherwise, that do not use countertop space. As such there is a need for the present invention which aids is moving, holding and storing of lids of cookware.

Referring to FIGS. 1-4, it can be seen that cookware lid holder 10 includes several assemblies to achieve functionality. Cookware lid holder 10 includes mounting assembly 20 which aids in securing and mounting the present invention onto a surface. Mounting assembly 20 includes a clamp base 24 adapted to be secured onto a flat surface 22 such as a table or stove top, for example. Clamp base 24 may preferably be C shaped, but it should be understood that any other shape may be suitable for clamp base 24. Clamp base 24 include a top end 26 and a bottom end 28. Clamp base 24 may include an opening 30 therethrough at bottom end 28. Mounted underneath of top end 26 may be a cushioning pad 32 adapted to prevent damage to flat surface 22 once clamp base 24 has been secured onto flat surface 22. Cushioning pad 32 may be of a shape that cooperates with the shape of top end 26 of clamp base 24. Extending therethrough opening 30 may be a threaded fastener 34 which includes a smooth portion 35 having a handle opening 36 extending therethrough. Handle opening 36 may be perpendicular and horizontal to smooth portion 35. It should be understood that opening 30 and handle opening 36 may be of a predetermined size to cooperate with components being inserted therethrough. Therethrough handle opening 36 may be a handle 38 extending therethrough. Handle 38 may include a first end 39 have a round stopper 40 thereon. Handle 38 may also include a second end 41 having a flat stopper 42 thereon. Handle 38 may slidably move therethrough handle opening 36. Handle 38 is restricted to extend up to round stopper 38 and flat stopper 40. Round stopper 38 and flat stopper 40 may preferably be larger than handle opening 36 to prevent handle 38 from being entirely removed from handle opening 36. Handle 38 is then rotated in order to rotate and move threaded fastener 34 up or down towards top end 26 or bottom end 28, respectively. Threaded fastener 34 may include a fastener head 44 which is rigidly circular disk adapted to make contact with a bottom of flat surface 22 for proper securing of mounting assembly 20 thereto. Fastener head 44 provides additional stability to the present invention when mounted to flat surface 22. Mounting assembly 20 may further include a female member 46 mounted adjacent to clamp base 24 at a rear side thereof. Female member 46 may extend substantially along the height of clamp base 24. Female member 46 may be cylindrical shaped and have both a top and bottom side open. Therethrough female member may also be a liner 47 which extends the entire interior length of female member 46 and further protrudes partially from the top side of female member 46. Mounting assembly 20 may also include an arm base attachment 48 mounted atop of clamp base 24. Arm base attachment 48 will be substantially U shaped. Arm base attachment 48 may a first side 49 and a second side 50. Each of first side 49 and second side 50 may include an arm fastener receiving portion 52 which may include fastener openings 54 extending horizontally therethrough. It may be suitable for any number of fastener openings 54 to be included in the present invention, however, in the immediate embodiment, two of fastener openings 54 are located thereon and are positioned diagonally from one another. Extending therefrom arm fastener receiving portion 52 may be a hook portion 56 extending outwardly and preferably diagonally from arm fastener receiving portion 52. Hook portion 56 may include a receiving opening 58. Receiving opening 58 may be adapted to receive and hold items therein as an anchor. Adjacent to arm fastener receiving portion 52 may be a male member 59. Preferably, male member 59 is mounted to a rear side of arm fastener receiving portion 52. Male member 59 may extend downwardly to be inserted therein female member 46. Male member 59 may rotate freely 360 degrees within female member 46 as per the needs of a user.

Figure 1:
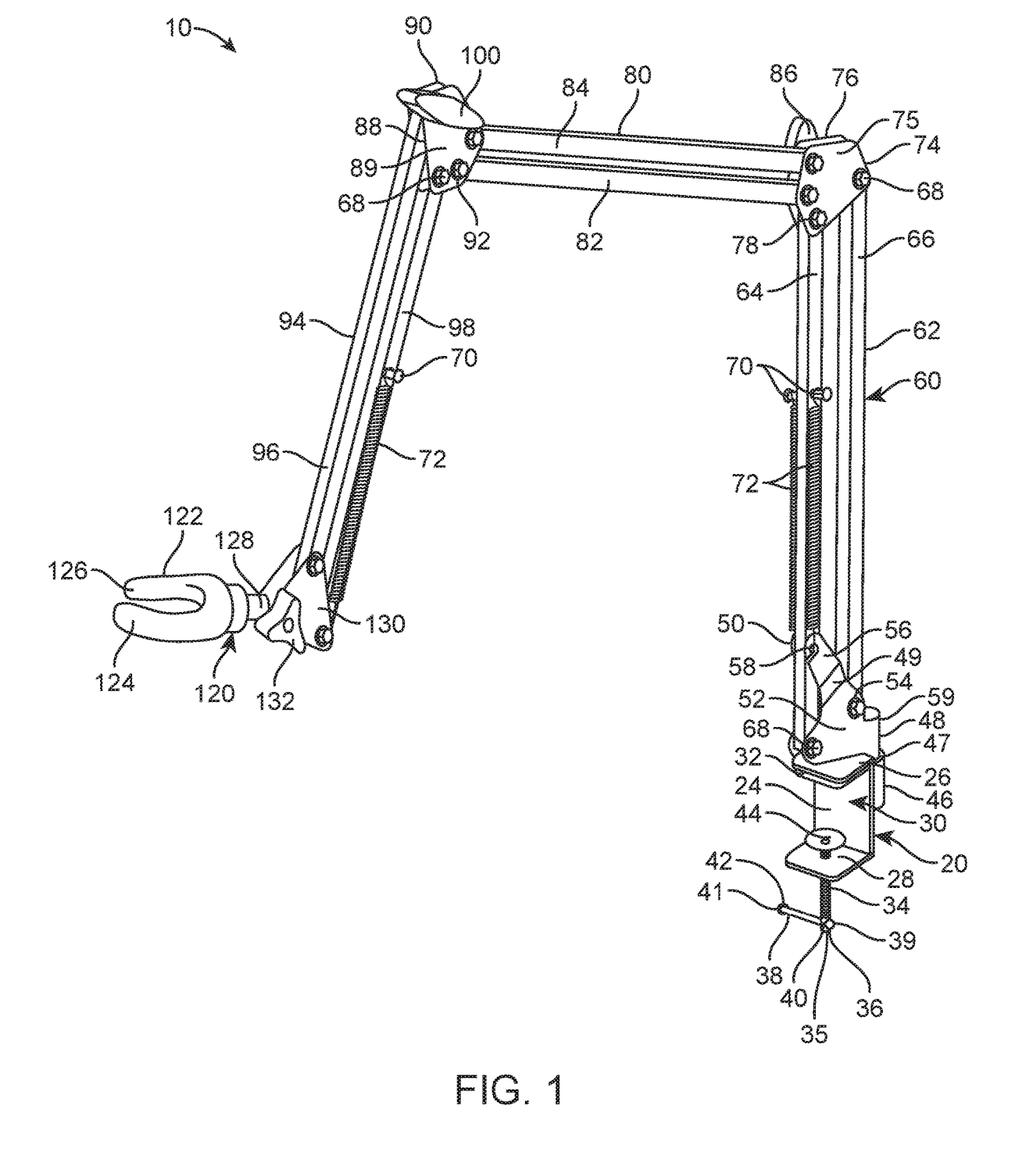
FIG. 1 represents an isometric view of the present invention.
Figure 2:
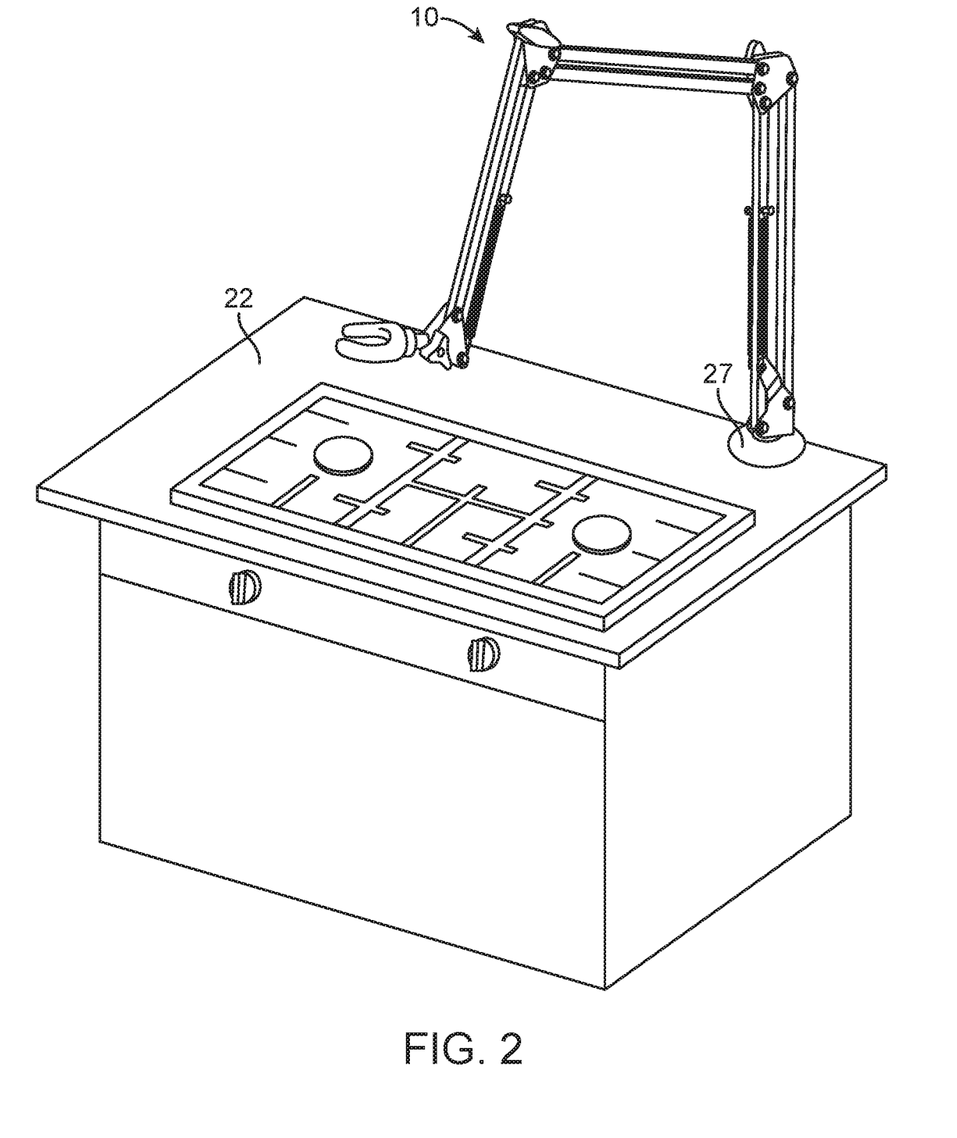
FIG. 2 shows alternate means by which the present invention can be mounted onto a surface.
Figure 2A:
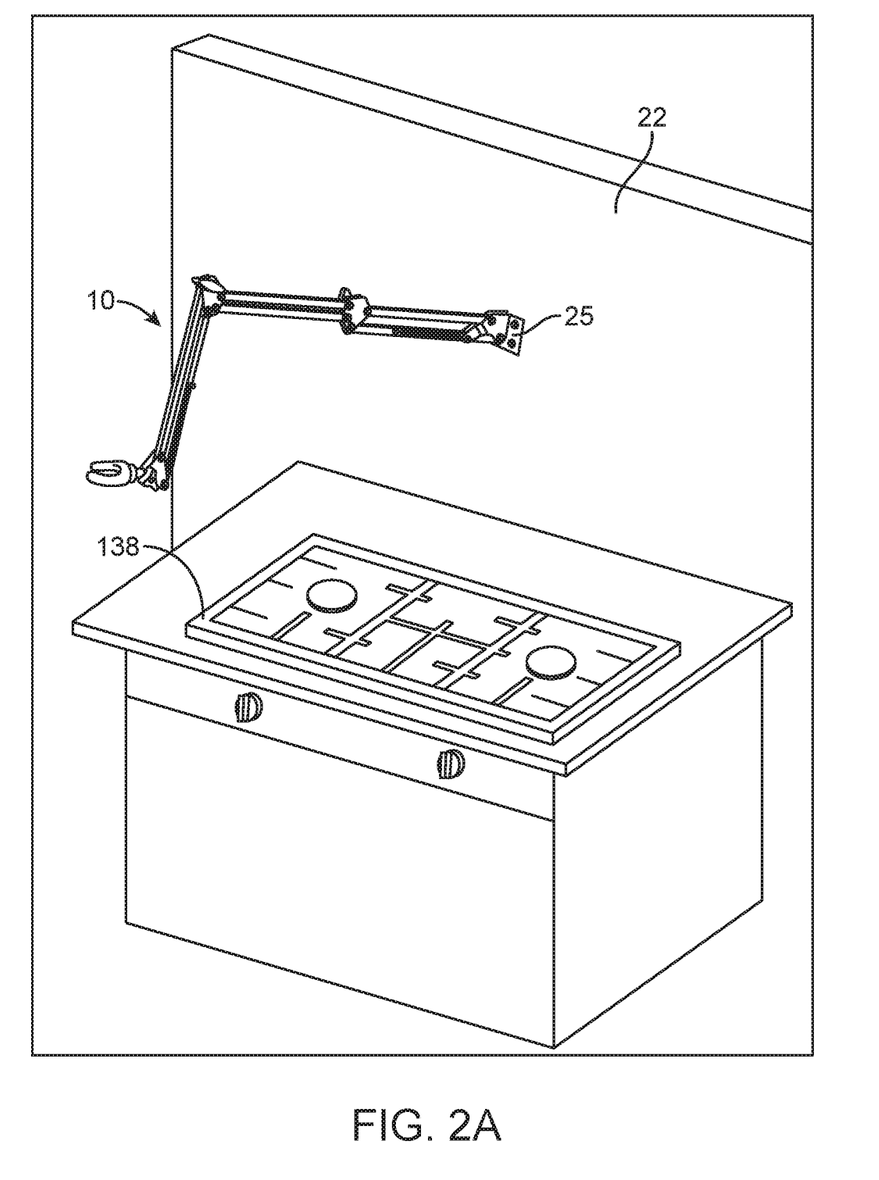
FIG. 2A shows another of alternate means by which the present invention can be mounted onto a surface.
Figure 3:
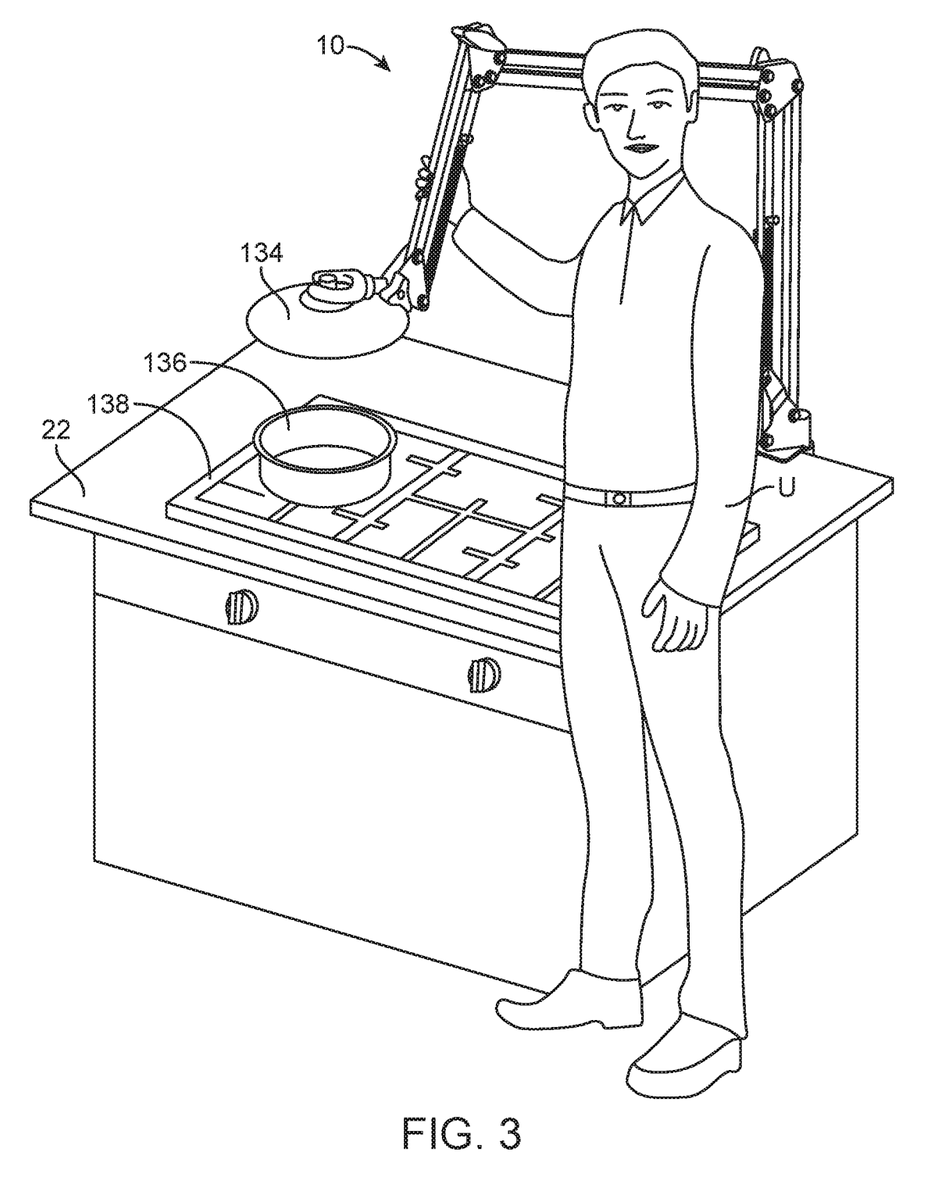
FIG. 3 illustrates the present invention in an operational setting.
Figure 4:
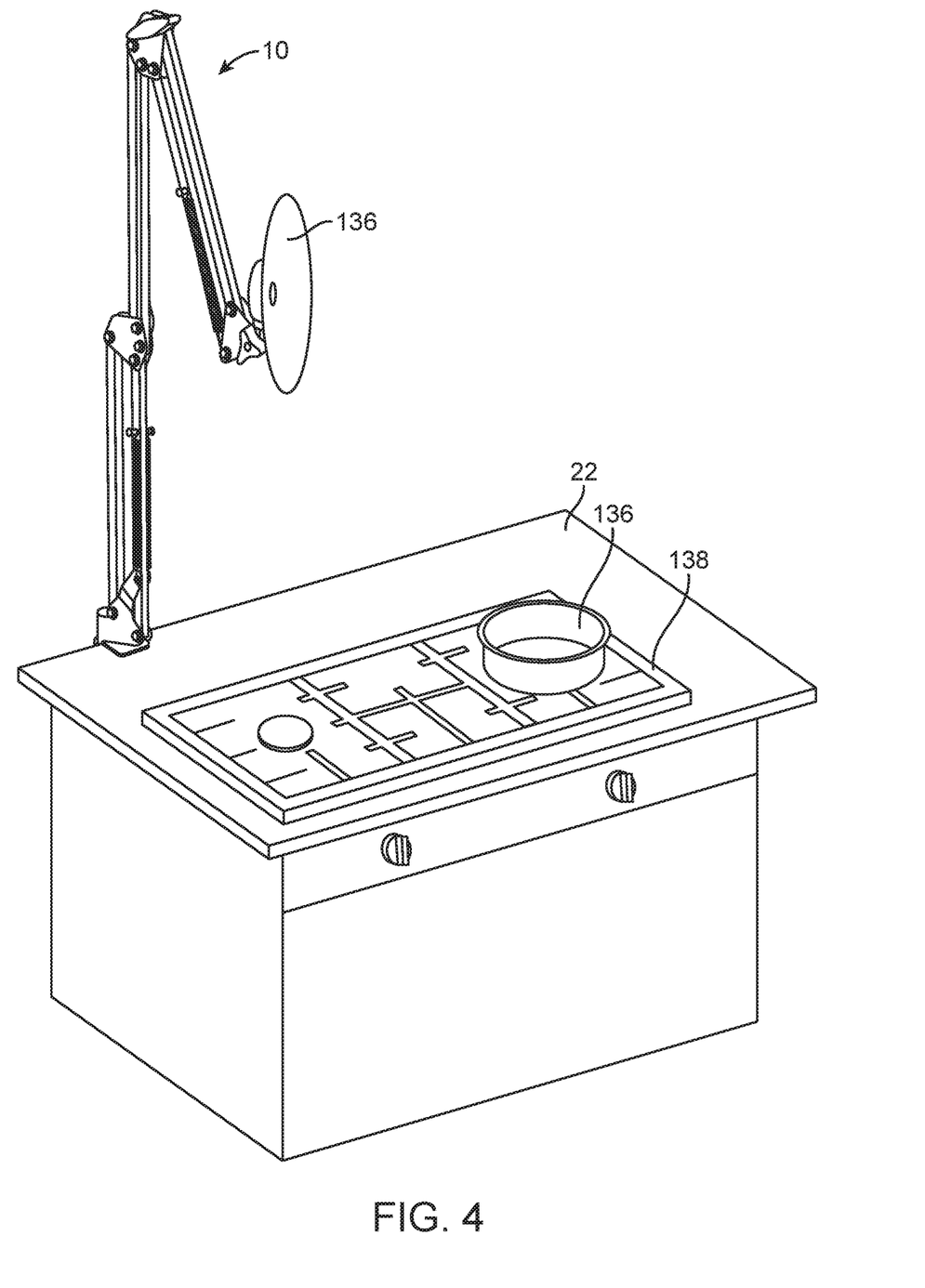
FIG. 4 is a representation of the present invention in another operation setting.

The present invention further includes adjusting arm assembly 60. Adjusting arm assembly 60 permits for different positioning of the present invention to hold lids as needed by users of the present invention. Importantly, the adjusting arm assembly 60 includes a first set of arms 62. First set of arms 62 being further defined as a first set arm 64 and a first set second arm 66. First set of arms 62 may be adjacent and parallel to one another. First set of arms 62 is received within arm base attachment 48. First set of arms 62 may be mounted atop of clamp base 24. First set of arms 62 are secured to arm base attachment 48 with fasteners 68 inserted therethrough fastener openings 54 extending from first side 49 to second side 50. First set arm 64 may be secured to arm base attachment 52 with fasteners 68 at a predetermined location that may be lower than where first set second arm 66 is secured to arm base attachment 52 with fasteners 68. First set arm 64 may have spring hooks 70 at predetermined locations on both a right and left side of first set arm 64. Springs 72 may extend therebetween receiving opening 58 of hook portion 56 and spring hooks 70. Springs 72 aid in maintaining first set of arms 62 in place properly. First set of arms 62 may extend upwardly a predetermined length when the present invention is not in use. First set of arms 62 may be rectangular shaped, however, it should be understood that it may be suitable for first set of arms 62 to be virtually any other shape, cylindrical, for example, in an alternate embodiment. First set of arms 62 may extend up to a first articulating joint 74. First articulating joint 74 may include a first joint front side 75 and a first joint rear side 76. First articulating joint 74 may include first joint fastener openings 78 adapted to secure first set of arms 62 thereto first articulating joint 74. Additionally, first articulating joint 74 may secure a second set of arms 80 thereto with fasteners 68 extending therethrough first joint fastener openings 78. Second set of arms 80 may include second set arm 82 and a second set second arm 84. Second set of arms 80 may be adjacent and parallel to one another. Second set of arms 80 may be identical to first set of arms 62. Second set of arms 80 may be substantially perpendicular to first set of arms 62. Positioning and angle at which first set of arms 62 and second set of arms 80 may be modified as per the needs of the user. Once the desired angle and position is reached, the user may use a first tightening knob 86 to lock in the desired positioning of first set of arms 62 and second set of arms 80. First tightening knob 86, in the immediate embodiment, may be mounted onto first joint rear side 76. However, in an alternate embodiment, it may be suitable for first tightening knob 86 to be mounted onto first joint front side 75. While first tightening knob 86 is fully tighten then first set of arms 62 and second set of arms 80 have limited range of motion. However, first tightening knob 86 still allows for the present invention to move freely about female member 46 to allow for horizontal and rotational movement. It may be suitable for second set of arms 80 to also include spring hooks 70 thereon second set arm 82. Second set of arms 80 may extend until a second articulating joint 88 is reached. Second articulating joint 88 may be adapted to receive and secure arms received therein in the same manner that first articulating joint 74 does. Second articulating joint 88 may include a second joint front side 89 and a second joint rear side 90. Second articulating joint 88 may include second joint fastener openings 92 adapted to secure second set of arms 80 thereto second articulating joint 88. Additionally, second articulating joint 88 may secure a third set of arms 94 thereto with fasteners 68 extending therethrough second joint fastener openings 92. Third set of arms 94 may include a third set arm 96 and a third set second arm 98. Third set of arms 94 may be adjacent and parallel to one another. On second joint front side 89 may be a second tightening knob 100 adapted to secure and hold third set of arms 94. Third set second arm 98 may include spring hooks 70 to secure springs 72 thereon. In an alternate embodiment it may be suitable for third set arm 96 to include spring hooks 70 instead. Second set of arms 80 and third set of arms 94 may be positioned and angled with the assistance of second tightening knob 100 and springs 72. Third set of arms 94 may extend until a lid clamping assembly 120 is reached more specifically, until a clamp device articulating joint 130 is reached. Clamp articulating joint secures lid clamping assembly 120 to third set of arms 94. Lid clamping assembly 120 includes a lid handle clamping device 122 having a first holding arm 124 and a second holding arm 126 which are secured to an arm pivot 128. Arm pivot is secured to clamp device articulating joint 130 with fasteners 68. Arm pivot 128 allows for lid handle clamping device 122 to be able to move and rotate freely a predetermined amount. Arm pivot 128 results in endless positions and angles for first holding arm 124 and second holding arm 126. For example, first holding arm 124 and second holding arm 126 may be positioned entirely vertically, horizontally, at an obtuse angle or at an acute angle. Lid handle clamping device 122 may be adapted to receive and secure a lid 134 and lid handle of cookware such as a cooking pot 136 therein. First holding arm 124 and second holding arm 126 may be expandable and retractable, outwardly, as to permit grasping of different sized lids 134 of cooking pot 136. Thereby allowing the present invention to function properly despite the dimensions of the cookware lids. Positioning and angle of lid handle clamping device 122 may be secured and fixed, momentarily, with the use of clamp device tightening knob 132. Clamp device tightening knob 132 functions just like first tightening knob 86 and second tightening knob 100. It should be understood that the present invention may hold more than one of lid 134. It may be suitable for the present invention to include at least one of lid handle clamping device 122 and pertaining components to hold at least one of lid 134 or multiple of lid 134. It can be appreciated that the number of lid 134 to be held corresponds with the number of lid handle clamping device 122 in the present invention. As such it may be suitable for the present invention to include at least one of cooking pot 136. It should be under that if there are more than one of cooking pot 136, then there may be more than one of lid 134 and as such there may be more than one of lid handle clamping device 122 to allow holding of multiple of lid 134.

Once a user U has secured lid 134 of cooking pot 136 into lid clamping assembly 120, the user may position the present invention at angles and positions that best function with their cooking area such as a stove 138 and space. The present invention may be secured onto flat surface 22 clamp base 24, however, in an alternate embodiment, alternate means may be used to secure the present invention in place for use. For example, a suction cup 27 may be used instead of clamp base 24 to secure the present invention to flat surface 22. In another alternative embodiment, the present invention may be secured to flat surface 22 such as a wall instead with a wall bracket 25. The user may move lid 134 freely even with a lack of space in the cooking area with the present invention. The user may move lid 134 about in an endless amount of positions. With the present invention lid 134 can be held and secured when lid 134 is not in use or when it is but needs to be momentarily moved out of the way. It should be understood that the present invention should not be limited by shape, size, dimension, or materials. As any suitable shape, size, material or dimensions may be suitable as per the needs of the user.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a cookware lid holder, comprising:

a. a flat surface;

b. a mounting assembly including a clamp base having a top end, a bottom end and an opening, said flat surface received therebetween said top end and said bottom end, said bottom end including the opening extending therethrough to receive a threaded fastener therethrough, said threaded fastener including a smooth portion at a lower portion thereof, said smooth portion including a handle opening extending horizontally therethrough to receive a handle therethrough, said handle including a round stopper at said first end and a flat stopper at said second end, said round stopper and said flat stopper prevent said handle from being removed entirely from said handle opening, said threaded fastener including a fastener head at a distal end thereof, said handle being actuated and rotated therethrough said opening allows said threaded fastener and said fastener head to move towards said top end to secure said flat surface therebetween said top end and said fastener head, said clamp base having a female member mounted adjacent thereto on a rear side of said clamp base;

c. said mounting assembly further including an arm base attachment mounted atop of said clamp base, said arm base attachment including a first side and a second side, each of said first and second side including an arm fastener receiving portion, said arm fastener receiving portion including fastener openings extending horizontally therethrough, said arm base attachment further including a hook portion extending diagonally from said arm fastener receiving portion of each of said first and second side, said hook portion including a receiving opening at a distalmost end thereof, said hook portion securing a lower portion of springs therein, said arm base attachment including a male member at a back end thereof extending downwardly from said arm base attachment, said male member to be received and secured therein said female member;

d. an arm adjusting assembly including a first set of arms, said first set of arms further defined as a first set arm and a first set second arm, said first set arm and said first set second arm mounted onto a top end of said clamp base, said first set arm and said first set second arm received therebetween said first and second side of said arm base attachment and secured with fasteners extending therethrough said fastener openings from said first side through said each of said first set arm and said first set second arm and through said second side, one of said first set of arms may include spring hooks at a left and right side thereof, said springs may extend from said hook portion to said spring hooks on both said left and right side thereof for stability to said first set of arms, at a distal end of said first set of arms is a first articulating joint having a first joint front side, a first joint rear side, and first joint fastener openings, said first set of arms and a second set of arms are secured therebetween said first joint front side and said first joint rear side with said fasteners extending therethrough said first joint fastener openings, said second set of arms further defined as a second arm and a second set second arm extending from said first articulating joint to a second articulating joint, said first set of arms and said second set of arms secured into a desired position with a first tightening knob mounted thereon said first articulating joint, said first tightening knob being tightened to achieve said desired position, said second articulating joint having a second joint first side and a second joint second side, said second set of arms and a third set of arms being secured therebetween said second joint first side and a second joint second side with said fasteners extending therethrough second joint fastener openings of said second articulating joint, said third set of arms further defined as a third set arm and a third set second arm, one of said third set of arms including said spring hooks for extending one of said springs from said spring hooks on one of said third set of arms to a clamp device articulating joint, said positioned by a second tightening knob to achieve said desired position of said third set of arms, third set of arms extending therebetween said second articulating joint and said clamp device articulating joint said third set of arms secured with said fasteners to said clamp device articulating joint;

e. a lid clamp assembly including at least one lid handle clamping device including a first holding arm and a second holding arm, said at least one lid handle clamping device being mounted to an arm pivot, said arm pivot mounted to said clamp device articulating joint, said arm pivot allow rotation and movement of said at least one lid handle clamping device, said lid clamping assembly further including a clamp device tighten knob mounted thereon said clamp device articulating joint to position said arm pivot and said at least one lid handle clamping device in a fixed position;

f. a stove having at least one cooking pot including at least one lid; and g. said at least one lid being received and secured within said at least one lid handle clamping device for free movement of each of said at lest least one lid away and above from said at least one cooking pot to allow a user more space when cooking without needing to place said at least one lid on said flat surface, said user can position said cookware lid holder as best suits said user's needs while cooking.

2. The system of claim 1, wherein said top end has a cushioning pad mounted entirely underneath to prevent damage to said flat surface being secured therebetween said clamp base.

3. The system of claim 1, wherein said female member includes a liner extending therethrough for securing said male member therein.

4. The system of claim 1, wherein said first set of arms are adjacent and parallel to each other.

5. The system of claim 1, wherein said second set of arms are adjacent and parallel to each other.

6. The system of claim 1, wherein said third set of arms are adjacent and parallel to each other.

7. The system of claim 1, wherein said first set of arms extend substantially vertically.

8. The system of claim 1, wherein said cookware lid holder is secured to said flat surface with a suction cup.

9. The system of claim 1, wherein said cookware lid holder is secured to a flat surface such as a wall with a wall bracket.

10. The system of claim 1, wherein said arm pivot allows for 360-degree movement of said lid handle clamping device.

11. The system of claim 1, wherein said lid is held by said lid handle clamping device when said lid is being stored.

\* \* \* \* \*